United States Patent [19]
Frey et al.

[11] 3,828,529
[45] Aug. 13, 1974

[54] APPARATUS FOR FILTERING OIL VAPORS

[75] Inventors: Gunter Frey, Fellbach; Arthur Nikolaus, Hoflacher; Walter Ebing, Stuttgart; Hans Rolf Kalberer, Winnenden, all of Germany

[73] Assignee: Knecht Felterwerke Gesellschaft mit beschraenkter, Haftung, Germany

[22] Filed: Feb. 20, 1973

[21] Appl. No.: 333,795

[30] Foreign Application Priority Data
Mar. 1, 1972 Germany.......................... 2209718

[52] U.S. Cl................. 55/419, 55/498, 55/570, 55/521, 55/DIG. 19, 55/DIG. 28, 123/41.86, 123/119 B
[51] Int. Cl........................................... B01d 46/52
[58] Field of Search........................ 55/497–499, 55/510, 511, 419, 521, DIG. 19, DIG. 28; 123/119 B, 41.86

[56] References Cited
UNITED STATES PATENTS
| | | | |
|---|---|---|---|
| 3,589,108 | 6/1971 | Dingel et al. | 55/482 |
| 3,695,012 | 10/1972 | Rolland | 55/499 |
| 3,712,033 | 1/1973 | Gronholz | 55/497 X |

*Primary Examiner*—Frank W. Lutter
*Assistant Examiner*—William Cuchlinski, Jr.
*Attorney, Agent, or Firm*—Murray Schaffer

[57] ABSTRACT

Apparatus for filtering oil vapors exhausted from the crank case of a motor or the like, comprising a housing having a frontal cover disk and a star shaped pleated filter element located in the housing. An inlet member comprises a tubular connection having a pair of clamping means spaced from each other and adapted to clamp over a pleat, is formed integrally with the cover disk. The clamping means span a defined sector of the filter element.

8 Claims, 3 Drawing Figures

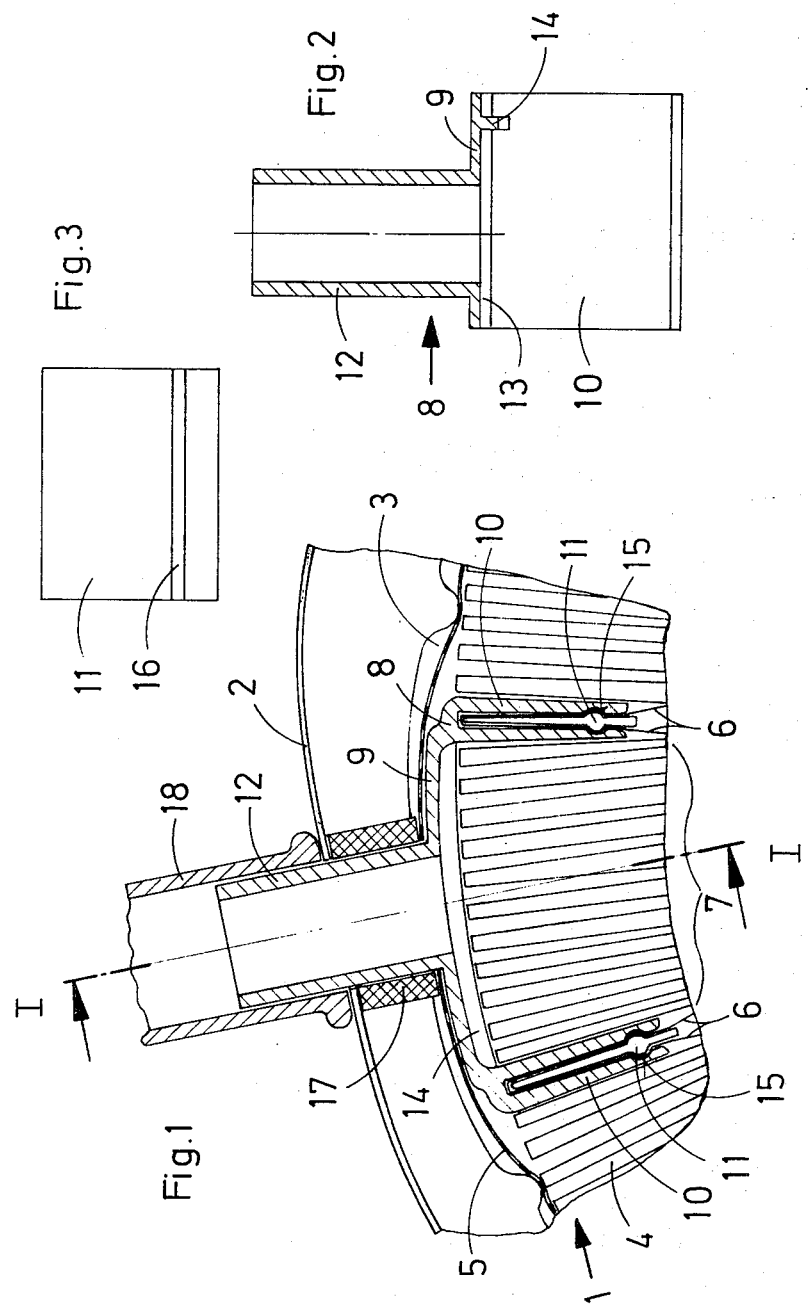

APPARATUS FOR FILTERING OIL VAPORS

BACKGROUND OF INVENTION

The present invention relates to filters and particularly to filter units for oil vapor exhaus of motors and the like.

The exhaust or air stream exiting from the crankcase of an engine or motor contains a great deal of oil vapor which is conventionally filtered from the air stream by passing the same through the air filter. In general such filters comprise a pleated filter cartridge whose elements is formed into a star shape by folding a band of filter material such as impregnated paper or the like. The element is set within a housing and is held therein by a covering disk. The air stream carrying the oil vapors is conducted from the crankcase over a conduit, connecting with a tubular fitting on the suction pipe or on the bottom of the housing of the air filter, to the tubular gas chamber of the filter unit. In this connection it must be borne in mind, that it is undesirable for the entire outer surface of the filter to become clogged with the oil vapor. Further the conduit carrying the oil vapor should not be directly connected to the filter.

The present invention proceeds from the known features, to avoid the mentioned defects and to provide means whereby oil vapor conduit is made as a tubular connection to the filter in the suction pipe or in the housing bottom and that the oil vapor is conducted directly to a defined and limited sector in the folds of the filter element, so that only a relatively few of the pleats are employed for the absorption of the oil vapors.

SUMMARY OF INVENTION

These objects are accomplished by providing an inlet member made integrally as a mold or casting with the covering disk and which is provided with means by which it is clamped to two spaced pleats in the filter element thereby covering only one small sector. The inlet member has a tubular connection adapted to extend out of the wall of the filter housing so that a connection can be made to the oil vapor conduit. Preferably the formed inlet member is made of a plastic or synthetic material substantially inert to oil vapor molded with the cover disk. The inlet member is provided with a shoulder plate having an outer or upper surface shape conforming to a perforated protecting jacket surrounding the filter cartridge. Depending from each of the ends of the shoulder is a slotted wall which is adapted to fit about one pleat of the filter element to resiliently grasp the single folded section. A clamping member is inserted within the fold itself, which reacts and cooperates with the slotted resilient wall to hold the folded section securely therein. The clamping member may be provided with a convex bead adjacent its inner end which fits into a correspondingly formed and mating groove formed in each of the sides of the slotted wall, thus insuring a fixed keying, groove and detent or similar holding means.

To make the insertion or assembly of the filter cartridge into the housing simple and easy, the tubular connection extending from the formed inlet member is offset from the center line of the shoulder plate and angularly disposed thereto. A seal ring member or collar is placed about the tube, which collar serves as a distance spacer piece between the filter elements and the wall of the housing. The inlet member is further provided with abutment ribs along the lower surface of the shoulder plate which stop against the edge of the folded filter element.

The accompanying drawing show and the following describes the full details of the present invention.

BRIEF DESCRIPTION OF DRAWINGS

In the Drawings:

FIG. 1 is a plan view partially in section through the filter cartridge and the surrounding housing;

FIG. 2 is a sectional view along lines I—I of FIG. 1; and

FIG. 3 is a side view of the clamping member.

DESCRIPTION OF INVENTION

Turning to FIG. 1 the filter housing and cartridge are depicted generally by the numeral 1. The housing comprises a conventional enclosure of metal or the like having a wall 2 which is enlarged in its interior to abut and hold a filter generally depicted by the numeral 3. The cartridge 3 is formed of a star shaped pleated filter element 4 having an outer perforated protecting jacket or cover 5. The filter element 4 is made from a continuous band of impregnated paper folded into a plurality of U-shaped folds 6.

Spanning a limited area 7 between two folds 6 is an inlet member 8 integrally molded or formed with the filter element covering disk not seen and comprising a slightly arcuate shoulder plate 9 from which depends at each of opposed ends a slotted or slit wall 10 forming a pair of pincer members each of which surrounds the closed end of one of the folds 6. A holding or clamping member 11 comprising a rectangularly shaped sheet is inserted from the open end of side of each of the folds 6 to press the folds against the sides of the pincer like wall 10. The inlet member 8 is made of plastic or similar material. It may also be made of resilient metal. In any event because of its construction the portions of the wall 10 are resilient and thus grasp the clamping member 11 and retain it securely inside of it, clamping the folds 6 in place.

Extending upwardly from the shoulder plate 9 is a tubular member 12 which passes through a hole in the protective jacket 5 and a hole in the wall 2 of the housing and which serves as the connection to the oil vapor conduit. Depending from the lower surface of the shoulder plate 9 are cross ribs 13 and 14 which are adapted to abut against the edges of the filter element, acting as a stop means when the form piece is assembled on the element, to maintain proper spacing and to insure that the walls 10 do not distort the walls 6 when they are pushed over them. Further, to insure that the pincer walls 10 hold the folds and to prevent the inlet member 8 from being pulled from them, the opposing portions of the wall 10 are provided with half-round grooves 15 and the clamping member 11 is provided with a corresponding and mating bead or longitudinal rib 15 on both its sides.

A resilient seal ring 17 collars the tubular extension 12 between the outer wall 2 of the housing and the perforated protecting jacket 5. Lastly the drawings show the connection of the oil vapor conduit 18, from the not shown engine, to the tubular extension.

As seen in FIG. 2, the tubular extension 12 is offset from the center between the ends of the shoulder plate transverse to the depending walls 10. Further, as seen in FIG. 1, the tubular extension is angularly set with respect to the shoulder plate 9 when viewed head on from either of the ends transverse to the depending walls 10. This peculiar arrangement of the tube insures installation in one manner only, thus simplifying the installation.

As will be seen, air and oil vapor entering through the inlet member passes first through the sector 7, wherein the oil vapor is trapped, while the air passes through the remainder of the filter element. Thus only a limited portion of the filter cartridge is contaminated by the oil vapor even though a direct connection can be made to the crank case.

Various modifications, changes and embodiments will be obvious to those skilled in this art. The present disclosure is therefore to be viewed as illustrative only and not as limiting the invention at all.

What is claimed:

1. Apparatus for filtering oil vapors exhausted from the crank case of a motor or the like, comprising an enclosed housing, a star shaped pleated filter element located in said housing, an inlet member impermeable to oil vapors comprising a tubular connection extending into said housing having a pair of clamping means integrally extending therefrom and spaced from each other, said tubular connection spanning a defined sector of said filter element and each of said clamping means clamping over a pleat to block flow of oil vapor out of said sector.

2. The apparatus according to claim 1 wherein said filter element is surrounded by a perforated protecting jacket and said inlet member comprises a shoulder plate integral with said tube having a shape conforming to that of said jacket, said clamping means comprising a resilient split wall extending from opposed ends of said shoulder, each wall being adapted to engage over the closed end of a pleat, and including a retaining member adapted to be inserted in the open end of each of the pleats and cooperaging with said split wall to hold said pleat therein.

3. The apparatus according to claim 2, wherein said inlet member is formed of plastic and molded together with said jacket.

4. The apparatus according to claim 2 wherein said split wall and said cooperating retaining member include mating detent means.

5. The apparatus according to claim 4 wherein said retaining member has a longitudinal bead on each side and said split wall is provided with a groove for receiving the same.

6. The apparatus according to claim 4 including a seal ring surrounding said tubular connection adapted to be located between the housing and the surrounding protective jacket.

7. The apparatus according to claim 2 wherein spacer means is provided on the under surface of said shoulder plate to maintain said plate a fixed distance from the edges of said pleats.

8. The apparatus according to claim 2 wherein said tubular connection is offset from the center of said shoulder plate and extends in a line angular to the surface of the shoulder plate.

* * * * *